(12) United States Patent
Kouda et al.

(10) Patent No.: US 11,752,805 B2
(45) Date of Patent: *Sep. 12, 2023

(54) PNEUMATIC TIRE

(71) Applicant: The Yokohama Rubber Co., LTD., Tokyo (JP)

(72) Inventors: Hiraku Kouda, Hiratsuka (JP); Tatsuro Shinzawa, Hiratsuka (JP); Takanori Uemura, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 866 days.

This patent is subject to a terminal disclaimer.

(21) Appl. No.: 16/077,987

(22) PCT Filed: Feb. 14, 2017

(86) PCT No.: PCT/JP2017/005357
§ 371 (c)(1),
(2) Date: Aug. 14, 2018

(87) PCT Pub. No.: WO2017/141912
PCT Pub. Date: Aug. 24, 2017

(65) Prior Publication Data
US 2021/0213786 A1 Jul. 15, 2021

(30) Foreign Application Priority Data
Feb. 15, 2016 (JP) .............................. JP2016-025847

(51) Int. Cl.
*B60C 11/04* (2006.01)
*B60C 11/12* (2006.01)
*B60C 11/13* (2006.01)

(52) U.S. Cl.
CPC .......... *B60C 11/04* (2013.01); *B60C 11/1263* (2013.01); *B60C 11/1272* (2013.01); *B60C 11/1392* (2013.01); *B60C 2011/1209* (2013.01)

(58) Field of Classification Search
CPC . B60C 11/04; B60C 11/1263; B60C 11/1272; B60C 11/1392;
(Continued)

(56) References Cited

U.S. PATENT DOCUMENTS

| | | | |
|---|---|---|---|
| 2010/0084062 A1* | 4/2010 | Miyazaki | B60C 11/1281 152/209.18 |
| 2011/0220260 A1* | 9/2011 | Kaji | B60C 11/1218 152/209.18 |

(Continued)

FOREIGN PATENT DOCUMENTS

| | | |
|---|---|---|
| CN | 105270101 | 1/2016 |
| DE | 10 2012 109 712 | 4/2014 |

(Continued)

OTHER PUBLICATIONS

International Search Report for International Application No. PCT/JP2017/005357 dated Apr. 4, 2017, 4 pages, Japan.

*Primary Examiner* — Galen H Hauth
*Assistant Examiner* — Shibin Liang
(74) *Attorney, Agent, or Firm* — THORPE NORTH & WESTERN

(57) ABSTRACT

In a pneumatic tire including main grooves extending in a tire circumferential direction in a tread portion, and including a sipe extending in a tire lateral direction on a rib defined by the main grooves, the sipe includes an edge on a leading side and an edge on a trailing side, chamfered portions shorter than a sipe length of the sipe are formed on respective edges, non-chamfered regions on which no other chamfered portion exists exist on portions opposing to respective chamfered portions in the sipe, a maximum depth x (mm) of the sipe and a maximum depth y (mm) of the chamfered portion satisfy $x \times 0.1 \leq y \leq x \times 0.3 + 1.0$, and a sipe width of the sipe is constant in a range from an end portion positioned (Continued)

inside in a tire radial direction of the chamfered portion to a groove bottom of the sipe.

16 Claims, 7 Drawing Sheets

(58) Field of Classification Search
CPC . B60C 2011/1209; B60C 11/03; B60C 11/12; B60C 1/00; B60C 11/13
See application file for complete search history.

(56) References Cited

U.S. PATENT DOCUMENTS

| | | |
|---|---|---|
| 2013/0206298 A1 | 8/2013 | Guillermou et al. |
| 2014/0224395 A1 | 8/2014 | Kawakami |
| 2015/0210121 A1 | 7/2015 | Sanae |
| 2016/0297254 A1 | 10/2016 | Numata |
| 2018/0162166 A1* | 6/2018 | Hiraishi ............. B60C 11/0327 |

FOREIGN PATENT DOCUMENTS

| | | | | |
|---|---|---|---|---|
| JP | 2005075213 | * | 3/2005 | ............ B60C 11/12 |
| JP | 2013-035345 | | 2/2013 | |
| JP | 2013-537134 | | 9/2013 | |
| JP | 2015-047977 | | 3/2015 | |
| JP | 2015-140047 | | 8/2015 | |
| JP | 2015-231812 | | 12/2015 | |
| JP | 2016-088165 | | 5/2016 | |
| WO | WO 2012/032144 | | 3/2012 | |
| WO | WO 2014/056651 | | 4/2014 | |
| WO | WO 2015/083474 | | 6/2015 | |

* cited by examiner

PNEUMATIC TIRE

TECHNICAL FIELD

The present technology relates to a pneumatic tire, more specifically relates to a pneumatic tire capable of providing good improvement of steering stability performance on dry road surfaces and improvement of steering stability performance on wet road surfaces in a compatible manner by devising a chamfer shape of a sipe.

BACKGROUND ART

In the related art, a plurality of sipes is formed on a rib defined by a plurality of main grooves in a tread pattern of a pneumatic tire. By forming these sipes, drainage properties are ensured, and the steering stability performance on wet road surfaces is delivered. However, when a lot of sipes are disposed in a tread portion for enhancing the steering stability performance on wet road surfaces, there are disadvantages in which the steering stability performance on dry road surfaces and uneven wear resistance performance decrease due to lowering of rigidity of a rib.

Additionally, various kinds of pneumatic tires in which sipes are formed in a tread pattern, and chamfered are proposed (for example, see Japan Patent Publication No. 2013-537134). When sipes are formed and chamfered, an edge effect may be lost depending on a chamfer shape, and the steering stability performance on dry road surfaces or the steering stability performance on wet road surfaces may be insufficiently improved depending on a chamfer dimension.

SUMMARY

The present technology provides a pneumatic tire capable of providing good improvement of steering stability performance on dry road surfaces and improvement of steering stability performance on wet road surfaces in a compatible manner by devising a chamfer shape of a sipe.

A pneumatic tire of the present technology for achieving the above-described objective is a pneumatic tire including a plurality of main grooves extending in a tire circumferential direction in a tread portion including a sipe extending in a tire lateral direction on a rib defined by the main grooves, the sipe includes an edge on a leading side and an edge on a trailing side, chamfered portions shorter than a sipe length of the sipe are formed on the respective edges on the leading side and on the trailing side, non-chamfered regions on which no other chamfered portion exists exist on portions opposing to respective chamfered portions in the sipe, a maximum depth x (mm) of the sipe and a maximum depth y (mm) of the chamfered portion satisfy a relationship of the following Formula (1), and a sipe width of the sipe is constant in a range from an end portion positioned inside in a tire radial direction of the chamfered portion to a groove bottom of the sipe;

$$x \times 0.1 \leq y \leq x \times 0.3 + 1.0 \quad (1).$$

In the present technology, in a pneumatic tire including a sipe extending in a tire lateral direction on a rib defined by main grooves, by providing respective chamfered portions shorter than a sipe length of a sipe on edges on a leading side and on a trailing side of the sipe, whereas providing non-chamfered regions on which no other chamfered portion exists on respective portions opposing to chamfered portions in the sipe, it is possible to enhance a drainage effect based on the chamfered portion, and at the same time, to effectively remove a water film on the non-chamfered region by an edge effect. Accordingly, it is possible to improve steering stability performance on wet road surfaces significantly. Additionally, since the chamfered portion and the non-chamfered region are provided on the respective edges on the leading side and on the trailing side in a mixed manner, it is possible to maximally enjoy an effect of enhancing the above-described wet performance during braking and driving. In addition, an area to be chamfered may be minimized in comparison with a sipe chamfered as in the related art, thus it is possible to improve steering stability performance on dry road surfaces. As a result, it is possible to provide good improvement of the steering stability performance on wet road surfaces and improvement of the steering stability performance on dry road surfaces in a compatible manner.

In the present technology, both end portions of the sipe preferably open into the main grooves. In this way, it is possible to enhance balance of rigidity of the rib, and as a result, enhance uneven wear resistance performance.

In the present technology, the sipe preferably includes a raised bottom portion. Accordingly, it is possible to provide good improvement of the steering stability performance on dry road surfaces and improvement of the steering stability performance on wet road surfaces in a compatible manner. A bottom of an end portion or a portion other than the end portion of the sipe may be raised.

In the present technology, a height of the raised bottom portion disposed on a portion other than the end portion of the sipe is preferably from 0.2 to 0.5 times the maximum depth x of the sipe. As described above, since the height of the raised bottom portion disposed on a portion other than the end portion of the sipe is set to an appropriate height, it is possible to improve rigidity of a block and maintain a drainage effect, thereby improving the steering stability performance on wet road surfaces. More preferably, the height is from 0.3 to 0.4 times the depth.

In the present technology, the height of the raised bottom portion disposed on the end portion of the sipe is preferably from 0.6 to 0.9 times the maximum depth x of the sipe. As described above, since the height of the raised bottom portion disposed on the end portion of the sipe is set to an appropriate height, it is possible to improve the rigidity of a block and improve the steering stability performance on dry road surfaces. More preferably, the height is from 0.7 to 0.8 times the depth.

In the present technology, preferably, the sipe is inclined with respect to the tire circumferential direction. As described above, by making the sipe inclined, it is possible to improve pattern rigidity and further improve the steering stability performance on dry road surfaces.

In the present technology, an inclination angle on an acute angle side with respect to the tire circumferential direction of the sipe is preferably from 40° to 80°. As described above, by setting the inclination angle on the acute angle side with respect to the tire circumferential direction of the sipe, it is possible to improve the steering stability performance on dry road surfaces more effectively. More preferably, the angle is from 50° to 70°.

In the present technology, the chamfered portion is preferably disposed on the acute angle side of the sipe. In this way, it is possible to further enhance uneven wear resistance performance. Alternatively, the chamfered portion is preferably disposed on an obtuse angle side of the sipe. Accordingly, the edge effect increases, thereby making it possible to further improve the steering stability performance on wet road surfaces.

In the present technology, at least part of the sipe preferably curves or bends in a plan view. By forming at least part of the sipe as described above, a total amount of the edge of each of the sipes increases, thereby making it possible to improve the steering stability performance on wet road surfaces. The whole sipe may be an arc.

In the present technology, the chamfered portion preferably opens into the main groove. Accordingly, it is possible to further improve the steering stability performance on wet road surfaces. Alternatively, the chamfered portion preferably terminates within the rib. Accordingly, it is possible to further improve the steering stability performance on dry road surfaces.

In the present technology, an overlap length of the chamfered portion formed on the edge on the leading side of the sipe and the chamfered portion formed on the edge on the trailing side of the sipe is preferably from −30% to 30% of the sipe length. As described above, by appropriately setting the overlap length of the chamfered portion with respect to the sipe length, it is possible to provide good improvement of the steering stability performance on dry road surfaces and improvement of the steering stability performance on wet road surfaces in a compatible manner. More preferably, the overlap length is from −15% to 15% of the sipe length.

In the present technology, the chamfered portion is preferably disposed on a position of the edge on the leading side and on a position of the edge on the trailing side of the sipe. Disposing the chamfered portions as described above makes it possible to improve the uneven wear resistance performance.

In the present technology, a maximum width of the chamfered portion is preferably from 0.8 to 5.0 times a sipe width of the sipe. As described above, by appropriately setting the maximum width of the chamfered portion with respect to the sipe width, it is possible to provide good improvement of the steering stability performance on dry road surfaces and improvement of the steering stability performance on wet road surfaces in a compatible manner. More preferably, the maximum width is from 1.2 to 3.0 times the sipe width.

In the present technology, the chamfered portion preferably extends in parallel with the sipe. Accordingly, it is possible to improve the uneven wear resistance performance and provide good improvement of the steering stability performance on dry road surfaces and improvement of the steering stability performance on wet road surfaces in a compatible manner.

BRIEF DESCRIPTION OF DRAWINGS

FIGS. 7A and 7B are plan views of the respective modified examples.

FIGS. 8A to 8E are plan views of the respective modified examples.

DETAILED DESCRIPTION

The configuration of the present technology is described in detail below with reference to the accompanying drawings. Note that, in FIG. 1, CL is a tire center line.

Figure 1:
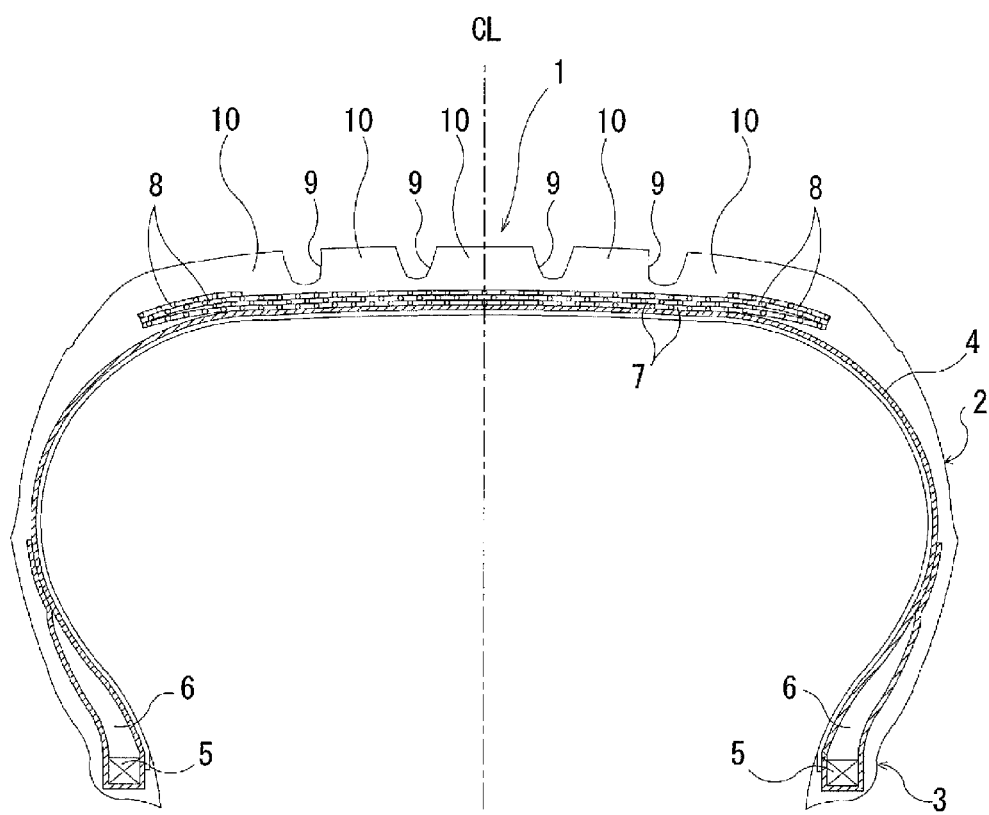
FIG. 1 is a meridian cross-sectional view illustrating a pneumatic tire according to an embodiment of the present technology.

As illustrated in FIG. 1, a pneumatic tire of an embodiment of the present technology includes an annular-shaped tread portion 1 extending in a tire circumferential direction, a pair of sidewall portions 2, 2 disposed on both sides of the tread portion 1, and a pair of bead portions 3, 3 disposed inward of the sidewall portions 2 in a tire radial direction.

A carcass layer 4 is mounted between the pair of bead portions 3,3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on a periphery of the bead core 5.

A plurality of belt layers 7 is embedded on an outer circumferential side of the carcass layer 4 in the tread portion 1. These belt layers 7 include a plurality of reinforcing cords that inclines with respect to the tire circumferential direction and the direction of the reinforcing cords of the different layers intersect each other. In the belt layers 7, an inclination angle of the reinforcing cords with respect to the tire circumferential direction ranges from, for example, 10° to 40°. Steel cords are preferably used as the reinforcing cords of the belt layers 7. For the purpose of improving high-speed durability, at least one layer of a belt cover layer 8 formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Also, a plurality of main grooves 9 extending in the tire circumferential direction is formed in the tread portion 1. These main grooves 9 define a plurality of ribs 10 in the tread portion 1.

Note that the tire internal structure described above is a representative example of that of a pneumatic tire, and is not limited thereto.

Figure 2:
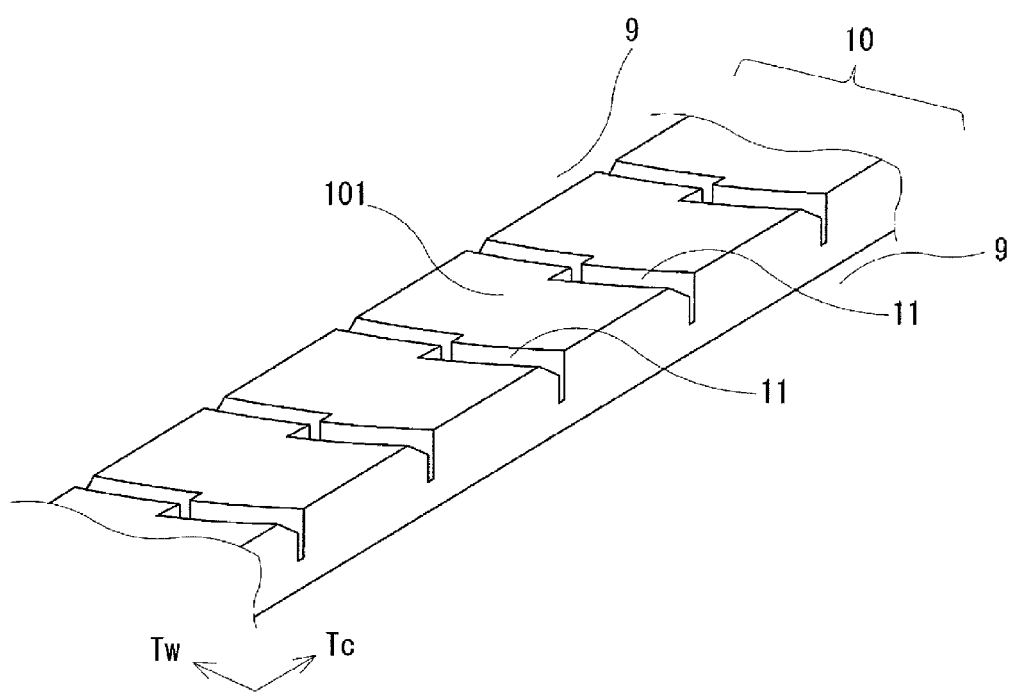
FIG. 2 is a perspective view illustrating part of a tread portion of a pneumatic tire according to the present technology.

FIG. 2 is a perspective view illustrating part of the tread portion 1, Tc indicates the tire circumferential direction and Tw indicates a tire lateral direction as illustrated in FIG. 2. As illustrated in FIG. 2, the rib 10 includes a plurality of sipes 11 extending in the tire lateral direction and a block 101 defined by the plurality of sipes 11. A plurality of blocks 101 is disposed side by side in the tire circumferential direction. The sipe 11 is a narrow groove having a groove width of not greater than 1.5 mm.

Figure 3:
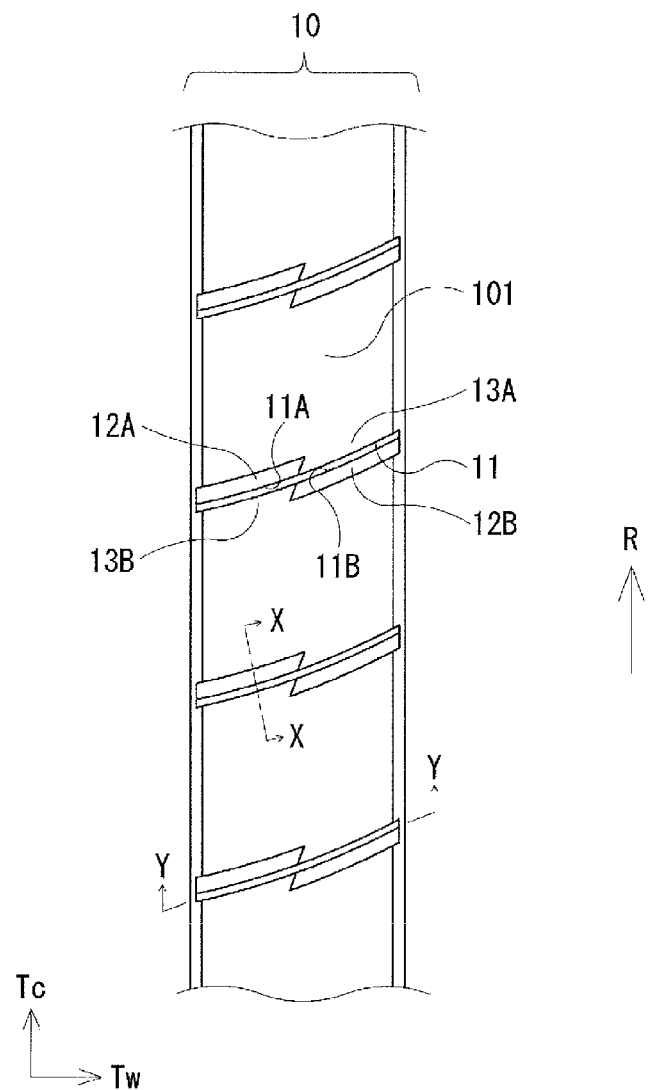
FIG. 3 is a plan view illustrating part of the tread portion of a pneumatic tire according to the present technology.

As illustrated in FIG. 3, the sipes 11 each have a curved shape as the whole shape, and are formed at an interval in the tire circumferential direction within the rib 10. Additionally, the sipe 11 includes an edge 11A as the leading side with respect to a rotation direction R, and an edge 11B as the trailing side with respect to the rotation direction R. Respective chamfered portions 12 are formed on the edge 11A on the leading side and the edge 11B on the trailing side.

The chamfered portions 12 include a chamfered portion 12A as the leading side with respect to the rotation direction R, and a chamfered portion 12B as the trailing side with respect to the rotation direction R. Non-chamfered regions 13 on which no other chamfered portion exists exist on portions opposing to these chamfered portions 12, respectively. That is, there is a non-chamfered region 13B as the trailing side with respect to the rotation direction R on a portion opposing to the chamfered portion 12A and there is a non-chamfered region 13A as the leading side with respect to the rotation direction R on a portion opposing to the chamfered portion 12B. The chamfered portion 12 and the non-chamfered region 13 on which no other chamfered portion exists are disposed to be adjacent to each other on the edge 11A on the leading side and the edge 11B on the trailing side of the sipe 11, respectively, as described above.

Figure 4:
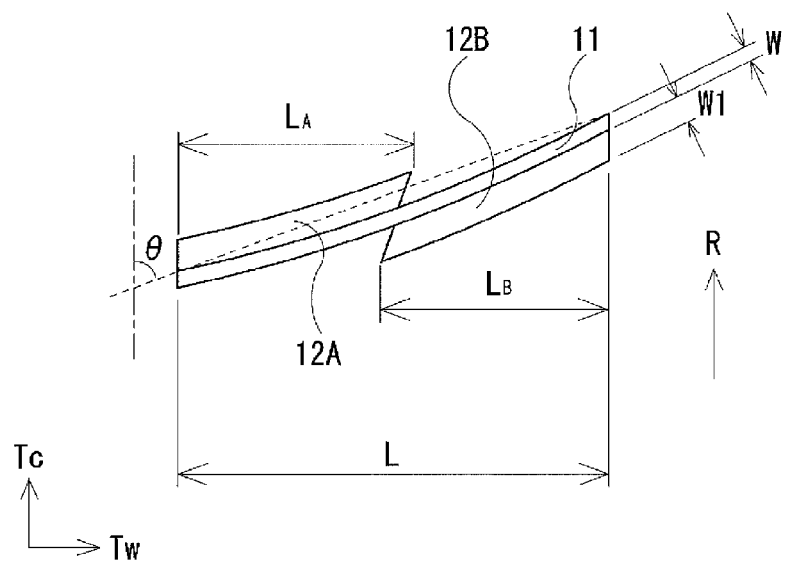
FIG. 4 is a plan view illustrating a sipe formed in the tread portion in FIG. 3 and a chamfered portion thereof.

As illustrated in FIG. 4, in the tire lateral direction, lengths of the sipe 11, the chamfered portions 12A and 12B are a sipe length L, chamfer lengths $L_A$ and $L_B$, respectively. The sipe length L, the chamfer lengths $L_A$ and $L_B$ are lengths in the tire lateral direction from one end portions to the other end portions of the sipe 11, the chamfered portions 12A and 12B, respectively. Both the chamfer lengths $L_A$ and $L_B$ of the respective chamfered portions 12A and 12B are formed so as to be shorter than the sipe length L of the sipe 11.

Figure 5:
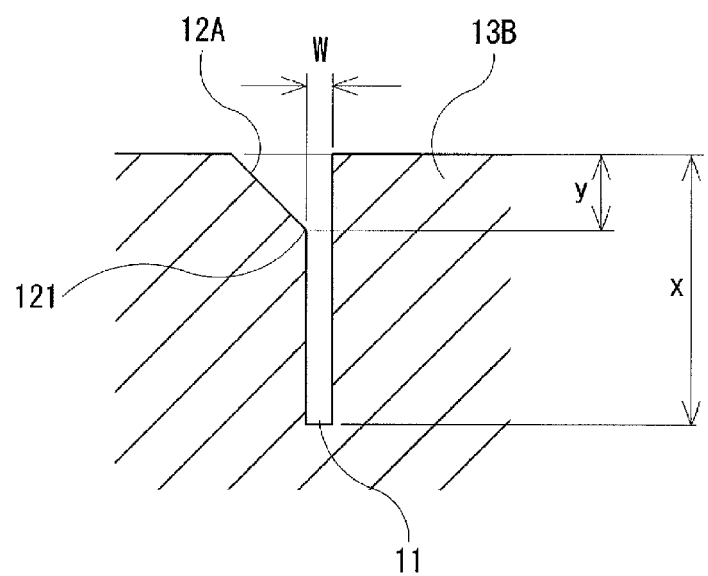
FIG. 5 is a cross-sectional view taken along a line X-X of FIG. 3.

FIG. 5 is a cross-sectional view perpendicular to the sipe 11 and cutting the tread portion 1 off in a vertical direction. As illustrated in FIG. 5, when a maximum depth of the sipe 11 is x (mm) and a maximum depth of the chamfered portion 12 is y (mm), the sipe 11 and the chamfered portion 12 are formed such that the maximum depth x (mm) and the maximum depth y (mm) satisfy a relationship of the following Formula (1). The maximum depth x of the sipe 11 is preferably from 3 mm to 8 mm. In a range from an end portion 121 positioned inside the chamfered portion 12 in the tire radial direction to a groove bottom of the sipe 11, a sipe width W of the sipe 11 is substantially constant. This sipe width W, for example, in a case that a protrusion exists on a groove wall of the sipe 11, does not include a height of the protrusion, or in a case that the sipe width of the sipe 11 gradually narrows while proceeding toward the groove bottom, does not include a narrow portion, and thus is a substantially measured width of the sipe 11.

$$x \times 0.1 \leq y \leq x \times 0.3 + 1.0 \quad (1)$$

In the above-described pneumatic tire, by providing the respective chamfered portions 12 shorter than the sipe length L of the sipe 11 on the edge 11A on the leading side and the edge 11B on the trailing side of the sipe 11, and providing the respective non-chamfered regions 13 on which no other chamfered portion exists on the portions opposing to chamfered portions 12 in the sipe 11, it is possible to enhance the drainage effect based on the chamfered portion 12, and at the same time, to effectively remove a water film on the non-chamfered region 13 on which the chamfered portion 12 is not provided by the edge effect. Accordingly, it is possible to improve steering stability performance on wet road surfaces significantly. Additionally, since the chamfered portion 12 and the non-chamfered region 13 on which no chamfered portion exists are provided on the edge 11A on the leading side and the edge 11B on the trailing side, respectively, in a mixed manner, it is possible to maximally enjoy an effect of enhancing the above-described wet performance during braking and driving.

Additionally, in the above-described pneumatic tire, the maximum depth x (mm) and the maximum depth y (mm) need to satisfy the above-described relationship of Formula (1). By providing the sipe 11 and the chamfered portions 12 so as to satisfy the above-described relationship of Formula (1), an area to be chamfered may be minimized in comparison with a sipe chamfered as in the related art, thus it is possible to improve the steering stability performance on dry road surfaces. As a result, it is possible to provide good improvement of the steering stability performance on wet road surfaces and improvement of the steering stability performance on dry road surfaces in a compatible manner. Here, in a case of y<x×0.1, the drainage effect based on the chamfered portion 12 becomes insufficient, and conversely in a case of y>x×0.3+1.0, the steering stability performance on dry road surfaces lowers due to decrease in rigidity of the rib 10. Especially, a relationship of y≤x×0.3+0.5 is preferably satisfied.

The sipe 11 is an open sipe extending across the rib 10 in the tire lateral direction, as illustrated in FIG. 2. That is, both end portions of the sipe 11 communicate with the main grooves 9 positioned on both sides of the rib 10, respectively. In this way, since both the end portions of the sipe 11 open into the main grooves 9, it is possible to enhance the balance of rigidity of the rib 10, and as a result, enhance the uneven wear resistance performance.

Additionally, the sipe 11 is formed, as illustrated in FIG. 4, so as to have an inclination angle θ with respect to the tire circumferential direction. The inclination angle θ refers to an angle formed by an imaginary line connecting both end portions of the sipe 11 (a dotted line illustrated in FIG. 4) and a side surface of the block 101. As the inclination angle θ, an inclination angle on the acute angle side and an inclination angle on the obtuse angle side exist, and FIG. 4 illustrates the inclination angle θ on the acute angle side. Additionally, the inclination angle θ is an inclination angle of the sipe 11 at an intermediate pitch of the rib 10. At this time, the inclination angle θ on the acute angle side is preferably from 40° to 80°, more preferably from 50° to 70°. As described above, by making the sipe 11 inclined with respect to the tire circumferential direction, it is possible to improve the pattern rigidity and further improve the steering stability performance on dry road surfaces. Here, when the inclination angle θ is smaller than 40°, the uneven wear resistance performance deteriorates, and when the angle is greater than 80°, the pattern rigidity may not be sufficiently improved.

In the present technology, a side having the inclination angle θ on the acute angle side of the sipe 11 is an acute angle side, and a side having the inclination angle θ on the obtuse angle side of the sipe 11 is an obtuse angle side. The chamfered portions 12A and 12B formed on the edges 11A and 11B of the sipe 11, respectively, are formed on the acute angle side of the sipe 11. In this way, since the acute angle sides of the sipe 11 are chamfered, it is possible to further enhance the uneven wear resistance performance. Alternatively, the chamfered portions 12A and 12B may be formed on the obtuse angle sides of the sipe 11, respectively. Since the chamfered portions 12A and 12B are formed on the obtuse angle sides of the sipe 11, respectively, as described above, the edge effect increases, thereby further improving the steering stability performance on wet road surfaces.

In the present technology, although the curve as the whole shape of the above-described sipe 11 makes it possible to improve the steering stability performance on wet road surfaces, additionally, part of the sipe 11 may have a curving or bending shape in a plan view. By forming the sipe 11 as described above, total amounts of the edges 11A and 11B of the respective sipes 11 increase, thereby making it possible to improve the steering stability performance on wet road surfaces.

End portions of the respective chamfered portions 12A and 12B, positioned closer to the main grooves 9, communicate with the main grooves 9 positioned on both the sides of the rib 10, respectively, as illustrated in FIGS. 2 and 3. Since the chamfered portions 12A and 12B are formed as described above, it is possible to further improve the steering stability performance on wet road surfaces. Alternatively, the end portions of the respective chamfered portions 12A and 12B, positioned closer to the main grooves 9 may terminate within the rib 10 without communicating with the main grooves 9. Since the chamfered portions 12A and 12B are formed as described above, it is possible to further improve the steering stability performance on dry road surfaces.

Figure 7A:
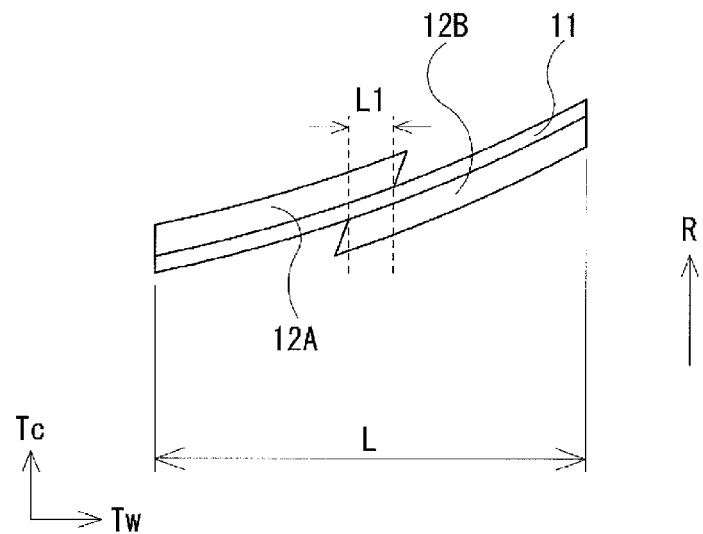
FIGS. 7A and 7B illustrate modified examples of the sipe and the chamfered portion thereof of the pneumatic tire according to the present technology.
Figure 7B:
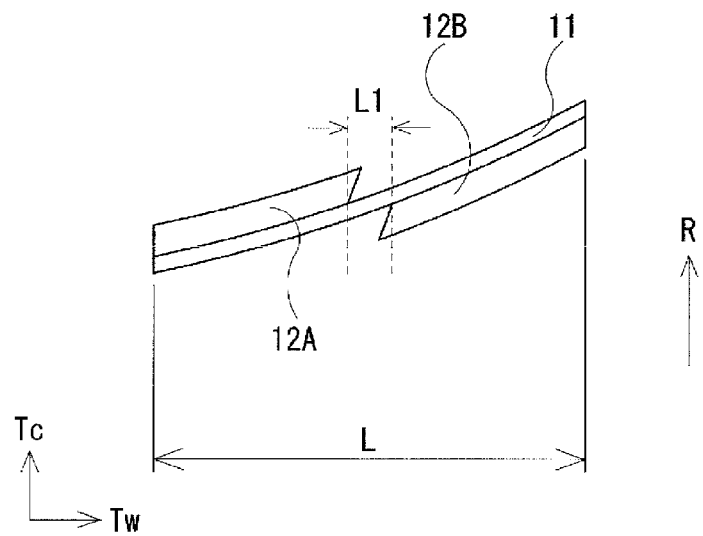

As illustrated in FIG. 7A, the chamfered portion 12A and the chamfered portion 12B are formed such that both parts of the respective chamfered portions 12A and 12B overlap with each other at a central portion of the sipe 11. Here, a length in the tire lateral direction of an overlapping portion as a portion on which the chamfered portion 12A and the chamfered portion 12B overlap is an overlap length L1. On the other hand, as illustrated in FIG. 7B, when no parts of the chamfered portion 12A and the chamfered portion 12B overlap and the chamfered portions 12A and 12B are distanced at constant intervals, a percentage of the overlap length L1 with respect to the sipe length L is denoted by a negative value. The overlap length L1 of the overlapping portion is preferably from −30% to 30% of the sipe length L, more preferably from −15% to 15% of L. As described above, by appropriately setting the overlap length L1 of the chamfered portions 12A and 12B with respect to the sipe length L, it is possible to provide good improvement of the steering stability performance on dry road surfaces and improvement of the steering stability performance on wet road surfaces in a compatible manner. Here, when the overlap length L1 is greater than 30% of L, the steering stability performance on dry road surfaces is insufficiently improved, and when L1 is smaller than −30% of L, the steering stability performance on wet road surfaces is insufficiently improved.

As illustrated in FIG. 3, the chamfered portions 12 are disposed on a position of the edge 11A on the leading side of the sipe 11 and on a position of the edge 11B on the trailing side of the sipe 11, respectively. Disposing the chamfered portions 12 as described above makes it possible to improve the uneven wear resistance performance. Here, when the chamfered portions 12 are disposed on more than one positions of the edge 11A on the leading side of the sipe 11 and on more than one positions of the edge 11B on the trailing side of the sipe 11, respectively, the number of sections increases, thus the uneven wear resistance performance tends to deteriorate.

Additionally, a maximum value of a width of the chamfered portion 12 measured along a direction orthogonal to the sipe 11 is a width W1. At this time, the maximum width W1 of the chamfered portion 12 is preferably from 0.8 to 5.0 times the sipe width W of the sipe 11, more preferably from 1.2 to 3.0 times W. As described above, by appropriately setting the maximum width W1 of the chamfered portion 12 with respect to the sipe width W, it is possible to provide good improvement of the steering stability performance on dry road surfaces and improvement of the steering stability performance on wet road surfaces in a compatible manner. Here, when the maximum width W1 of the chamfered portion 12 is smaller than 0.8 times the sipe width W of the sipe 11, the steering stability performance on wet road surfaces is insufficiently improved, and when W1 is greater than 5.0 times W, the steering stability performance on dry road surfaces is insufficiently improved.

Additionally, an outer edge portion in a longitudinal direction of the chamfered portion 12 is formed in parallel with an extension direction of the sipe 11. Since the chamfered portion 12 extends in parallel with the sipe 11 as described above, it is possible to improve the uneven wear resistance performance and provide good improvement of the steering stability performance on dry road surfaces and improvement of the steering stability performance on wet road surfaces in a compatible manner.

Figure 6:
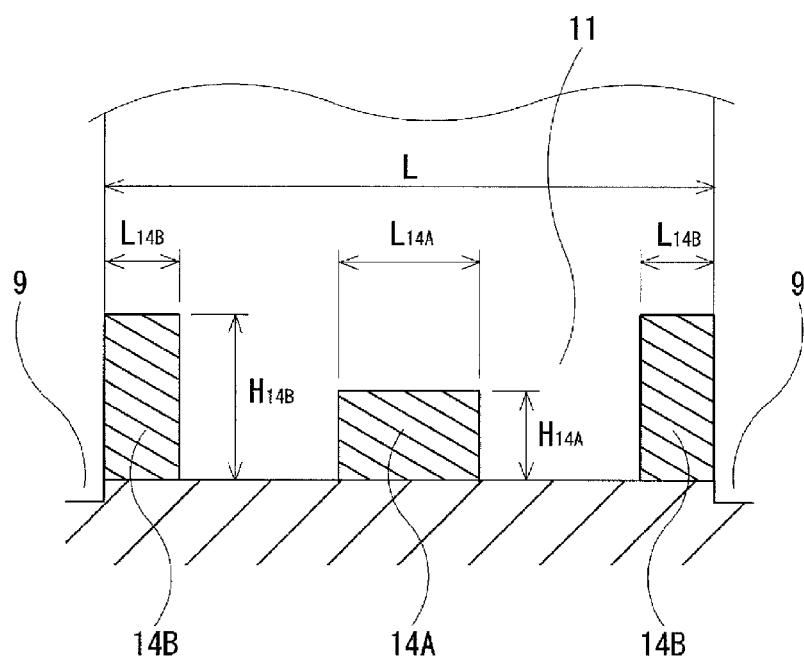
FIG. 6 is a cross-sectional view taken along a line Y-Y of FIG. 3.

As illustrated in FIG. 6, the sipe 11 includes raised bottom portions 14 on a part of the length direction thereof. As the raised bottom portion 14, a raised bottom portion 14A positioned on the central portion of the sipe 11 and raised bottom portions 14B positioned on both the respective end portions of the sipe 11 exist. As described above, by providing the raised bottom portions 14 on the sipe 11, it is possible to provide good improvement of the steering stability performance on dry road surfaces and improvement of the steering stability performance on wet road surfaces in a compatible manner. The raised bottom portions 14 of the sipe 11 may be formed on the end portions and/or on a portion other than the end portions of the sipe 11.

In the raised bottom portion 14A formed on the portion other than the end portions of the sipe 11, a maximum value of a height from the groove bottom of the sipe 11 to a top surface of the raised bottom portion 14A is $H_{14A}$. This height $H_{14A}$ is preferably from 0.2 to 0.5 times the maximum depth x of the sipe 11, more preferably from 0.3 to 0.4 times x. As described above, since the height $H_{14A}$ of the raised bottom portion 14A disposed on the portion other than the end portions of the sipe 11 is set to an appropriate height, it is possible to improve rigidity of the block 101 and maintain the drainage effect, thereby improving the steering stability performance on wet road surfaces. Here, when the height $H_{14A}$ is smaller than 0.2 times the maximum depth x of the sipe 11, the rigidity of the block 101 may not be sufficiently improved, and when the height is greater than 0.5 times x, the steering stability performance on wet road surfaces may not be sufficiently improved.

In the raised bottom portions 14B formed on both the respective end portions of the sipe 11, a maximum value of a height from the groove bottom of the sipe 11 to a top surface of the raised bottom portion 14B is $H_{14B}$. This height $H_{14B}$ is preferably from 0.6 to 0.9 times the maximum depth x of the sipe 11, more preferably from 0.7 to 0.8 times x. As described above, since the height $H_{14B}$ of the raised bottom portions 14B formed on the end portions of the sipe 11 is set to an appropriate height, it is possible to improve the rigidity of the block 101 and improve the steering stability performance on dry road surfaces. Here, when the height $H_{14B}$ is smaller than 0.6 times the maximum depth x of the sipe 11, the rigidity of the block 101 may not be sufficiently improved, and when the height is greater than 0.9 times x, the steering stability performance on wet road surfaces may not be sufficiently improved.

Additionally, in the tire lateral direction, lengths of the raised bottom portions 14A and 14B of the sipe 11 are raised bottom lengths $L_{14A}$ and $L_{14B}$, respectively. These raised bottom lengths $L_{14A}$ and $L_{14B}$ are preferably from 0.3 to 0.7 times the sipe length L, more preferably from 0.4 to 0.6 times L. As described above, by appropriately setting the respective raised bottom lengths $L_{14A}$ and $L_{14B}$ of the raised bottom portions 14A and 14B, it is possible to provide good improvement of the steering stability performance on dry road surfaces and improvement of the steering stability performance on wet road surfaces in a compatible manner.

Figure 8A:
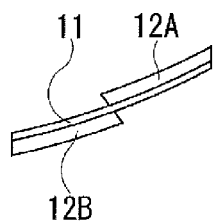
FIGS. 8A to 8E illustrate more other modified examples of the sipe and the chamfered portion thereof of the pneumatic tire according to the present technology.
Figure 8B:
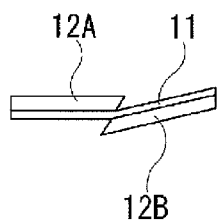
Figure 8C:
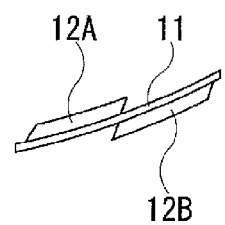
Figure 8D:
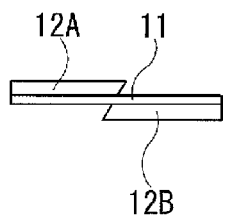
Figure 8E:
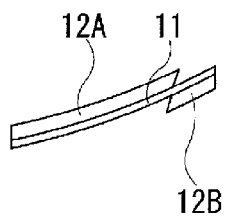

As the chamfered portions 12A and 12B of the sipe 11, besides examples illustrated in FIG. 2 to FIG. 4, FIGS. 7A and 7B, a case in which the obtuse angle sides of the sipe 11 are chamfered as illustrated in FIG. 8A, a case in which part of the sipe 11 bends as illustrated in FIG. 8B, and a case in which end portions of the respective chamfered portions 12A and 12B positioned closer to the main grooves 9 terminate within the rib 10 without opening into the main grooves 9 as illustrated in FIG. 8C may be illustrated. Additionally, a case in which the sipe 11 and the chamfered portions 12A and 12B are formed in parallel with the tire lateral direction as illustrated in FIG. 8D, and a case in which a boundary line in the tire lateral direction between the chamfered portion 12A and the chamfered portion 12B is significantly shifted from a center of the sipe 11 as illustrated in FIG. 8E may be illustrated.

EXAMPLES

Pneumatic tires having a tire size of 245/40R19, and including a plurality of main grooves extending in a tire circumferential direction in a tread portion, and sipes extending in a tire lateral direction on a rib defined by the main grooves were manufacturing according to Conventional Examples 1 and 2, Comparative Examples 1 and 2, and Examples 1 to 14 with following settings indicated in Table 1 and Table 2: disposition of chamfers (both sides or one side), comparison of sipe length L and chamfer lengths $L_A$ and $L_B$, presence or absence of chamfer of portion opposing to chamfered portion, maximum depth x of sipe (mm), maximum depth y of chamfered portion (mm), structure of sipe (communicating or not communicating), inclination angle on acute angle side with respect to tire circumferential direction of sipe, chamfered position of sipe (acute angle side or obtuse angle side), shape of entire sipe (straight lines or curved), presence or absence of opening into main groove of chamfered portion, percentage of overlap length L1 of chamfered portion with respect to sipe length L, number of chamfered positions (one or two), maximum width W1 of chamfered portion with respect to sipe width W (W1/W), shape of chamfer (parallel or non-parallel), presence or absence of raised bottom portion of sipe, and height of raised bottom portion on portion other than end portion of sipe with respect to maximum depth x of sipe ($H_{14A}$/x).

With reference to these test tires, sensory evaluation for the steering stability performance on dry road surfaces and the steering stability performance on wet road surfaces by a test driver, and visual evaluation for the uneven wear resistance performance were performed, and results were shown altogether in Table 1 and Table 2.

In Table 1 and Table 2, a structure of sipe is referred to as "communicating" when both the end portions of the sipe communicate with the respective main grooves positioned on both sides of the rib, and is referred to as "not communicating" when both the end portions of the sipe do not communicate with the respective main grooves and terminate within the rib. In the respective tires in Conventional Example 1, Comparative Examples 1 and 2, and Examples 1 to 14, in a range from an end portion positioned inside the chamfered portion in the tire radial direction to the groove bottom of the sipe, the sipe width is constant.

The sensory evaluation for the steering stability performance on dry road surfaces and the steering stability performance on wet road surfaces was performed with each of the test tires assembled on wheels having a rim size of 19×8.5J, and mounted on a vehicle, and under an air pressure condition of 260 kPa. Evaluation results were expressed as index values, Conventional Example 1 being assigned an index value of 100. Larger index values indicate excellent steering stability performance on dry road surfaces and excellent steering stability performance on wet road surfaces.

The visual evaluation for the uneven wear resistance performance was performed by visually evaluating appearance of the test tires after driving 4000 km with each of the test tires assembled on wheels having a rim size of 19×8.5J, and mounted on a vehicle, and under an air pressure condition of 260 kPa. Evaluation results were expressed as index values, Conventional Example 1 being assigned an index value of 100. Larger index values indicate excellent uneven wear resistance performance.

TABLE 1-1

|  | Conventional Example 1 | Conventional Example 2 | Comparative Example 1 | Comparative Example 2 |
|---|---|---|---|---|
| Disposition of chamfers (both sides or one side) | Both sides | One side | Both sides | Both sides |
| Comparison of sipe length L and chamfer lengths $L_A$ and $L_B$ | L = $L_A$, $L_B$ | L = $L_A$ | L > $L_A$, $L_B$ | L > $L_A$, $L_B$ |
| Presence or absence of chamfer of portion opposing to chamfered portion | Presence | Absence | Absence | Absence |
| Maximum depth x of sipe (mm) | 5 mm | 5 mm | 5 mm | 5 mm |
| Maximum depth y of chamfered portion (mm) | 2 mm | 5 mm | 0.3 mm | 3 mm |
| Structure of sipe (communicating or not communicating) | Communicating | Communicating | Communicating | Communicating |
| Inclination angle on acute angle side with respect to tire circumferential direction of sipe | 90° | 90° | 90° | 90° |
| Chamfered position of sipe (acute angle side or obtuse angle side) | Obtuse angle side | Obtuse angle side | Obtuse angle side | Obtuse angle side |
| Shape of entire sipe (straight lines or curved) | Straight lines | Straight lines | Straight lines | Straight lines |
| Presence or absence of opening into main groove of chamfered portion | Presence | Presence | Presence | Presence |

TABLE 1-1-continued

|  | Conventional Example 1 | Conventional Example 2 | Comparative Example 1 | Comparative Example 2 |
|---|---|---|---|---|
| Percentage of overlap length L1 of chamfered portion with respect to sipe length L | — | — | 0% | 0% |
| Number of chamfered positions (one or two) | 1 | 1 | 1 | 1 |
| Maximum width W1 of chamfered portion with respect to sipe width W (W1/W) | 0.5 | 0.5 | 0.5 | 0.5 |
| Shape of chamfer (parallel or non-parallel) | Parallel | Parallel | Parallel | Parallel |
| Presence or absence of raised bottom portion of sipe | Absence | Absence | Absence | Absence |
| Height of raised bottom portion on portion other than end portions of sipe with respect to maximum depth x of sipe ($H_{14A}/x$) | — | — | — | — |
| Steering stability performance on dry road surfaces | 100 | 90 | 103 | 98 |
| Steering stability performance on wet road surfaces | 100 | 105 | 98 | 103 |
| Uneven wear resistance performance | 100 | 100 | 100 | 100 |

TABLE 1-2

|  | Example 1 | Example 2 | Example 3 | Example 4 | Example 5 |
|---|---|---|---|---|---|
| Disposition of chamfers (both sides or one side) | Both sides | Both sides | Both sides | Both sides | Both sides |
| Comparison of sipe length L and chamfer lengths $L_A$ and $L_B$ | $L > L_A, L_B$ | $L > L_A, L_B$ | $L > L_A, L_B$ | $L > L_A, L_B$ | $L > L_A, L_B$ |
| Presence or absence of chamfer of portion opposing to chamfered portion | Absence | Absence | Absence | Absence | Absence |
| Maximum depth x of sipe (mm) | 5 mm | 5 mm | 5 mm | 5 mm | 5 mm |
| Maximum depth y of chamfered portion (mm) | 2 mm | 2 mm | 2 mm | 2 mm | 2 mm |
| Structure of sipe (communicating or not communicating) | Communicating | Not communicating | Communicating | Communicating | Communicating |
| Inclination angle on acute angle side with respect to tire circumferential direction of sipe | 90° | 90° | 85° | 60° | 60° |
| Chamfered position of sipe (acute angle side or obtuse angle side) | Obtuse angle side | Obtuse angle side | Obtuse angle side | Obtuse angle side | Acute angle side |
| Shape of entire sipe (straight lines or curved) | Straight lines | Straight lines | Straight lines | Straight lines | Straight lines |
| Presence or absence of opening into main groove of chamfered portion | Presence | Presence | Presence | Presence | Presence |
| Percentage of overlap length L1 of chamfered portion with respect to sipe length L | 0% | 0% | 0% | 0% | 0% |
| Number of chamfered positions (one or two) | 1 | 1 | 1 | 1 | 1 |
| Maximum width W1 of chamfered portion with respect to sipe width W (W1/W) | 0.5 | 0.5 | 0.5 | 0.5 | 0.5 |
| Shape of chamfer (parallel or non-parallel) | Parallel | Parallel | Parallel | Parallel | Parallel |

TABLE 1-2-continued

|  | Example 1 | Example 2 | Example 3 | Example 4 | Example 5 |
|---|---|---|---|---|---|
| Presence or absence of raised bottom portion of sipe | Absence | Absence | Absence | Absence | Absence |
| Height of raised bottom portion on portion other than end portions of sipe with respect to maximum depth x of sipe ($H_{14A}/x$) | — | — | — | — | — |
| Steering stability performance on dry road surfaces | 103 | 104 | 104 | 105 | 105 |
| Steering stability performance on wet road surfaces | 103 | 102 | 103 | 103 | 102 |
| Uneven wear resistance performance | 102 | 101 | 102 | 102 | 105 |

TABLE 2-1

|  | Example 6 | Example 7 | Example 8 | Example 9 | Example 10 |
|---|---|---|---|---|---|
| Disposition of chamfers (both sides or one side) | Both sides | Both sides | Both sides | Both sides | Both sides |
| Comparison of sipe length L and chamfer lengths $L_A$ and $L_B$ | $L > L_A, L_B$ | $L > L_A, L_B$ | $L > L_A, L_B$ | $L > L_A, L_B$ | $L > L_A, L_B$ |
| Presence or absence of chamfer of portion opposing to chamfered portion | Absence | Absence | Absence | Absence | Absence |
| Maximum depth x of sipe (mm) | 5 mm | 5 mm | 5 mm | 5 mm | 5 mm |
| Maximum depth y of chamfered portion (mm) | 2 mm | 2 mm | 2 mm | 2 mm | 2 mm |
| Structure of sipe (communicating or not communicating) | Communicating | Communicating | Communicating | Communicating | Communicating |
| Inclination angle on acute angle side with respect to tire circumferential direction of sipe | 60° | 60° | 60° | 60° | 60° |
| Chamfered position of sipe (acute angle side or obtuse angle side) | Acute angle side | Acute angle side | Acute angle side | Acute angle side | Acute angle side |
| Shape of entire sipe (straight lines or curved) | Curved | Curved | Curved | Curved | Curved |
| Presence or absence of opening into main groove of chamfered portion | Presence | Absence | Presence | Presence | Presence |
| Percentage of overlap length L1 of chamfered portion with respect to sipe length L | 0% | 0% | 10% | −10% | 0% |
| Number of chamfered positions (one or two) | 1 | 1 | 1 | 1 | 2 |
| Maximum width W1 of chamfered portion with respect to sipe width W (W1/W) | 0.5 | 0.5 | 0.5 | 0.5 | 0.5 |
| Shape of chamfer (parallel or non-parallel) | Parallel | Parallel | Parallel | Parallel | Parallel |

TABLE 2-1-continued

|  | Example 6 | Example 7 | Example 8 | Example 9 | Example 10 |
|---|---|---|---|---|---|
| Presence or absence of raised bottom portion of sipe | Absence | Absence | Absence | Absence | Absence |
| Height of raised bottom portion on portion other than end portions of sipe with respect to maximum depth x of sipe ($H_{14A}/x$) | — | — | — | — | — |
| Steering stability performance on dry road surfaces | 105 | 106 | 105 | 107 | 105 |
| Steering stability performance on wet road surfaces | 105 | 104 | 105 | 103 | 105 |
| Uneven wear resistance performance | 105 | 105 | 105 | 105 | 104 |

TABLE 2-2

|  | Example 11 | Example 12 | Example 13 | Example 14 |
|---|---|---|---|---|
| Disposition of chamfers (both sides or one side) | Both sides | Both sides | Both sides | Both sides |
| Comparison of sipe length L and chamfer lengths $L_A$ and $L_B$ | $L > L_A, L_B$ | $L > L_A, L_B$ | $L > L_A, L_B$ | $L > L_A, L_B$ |
| Presence or absence of chamfer of portion opposing to chamfered portion | Absence | Absence | Absence | Absence |
| Maximum depth x of sipe (mm) | 5 mm | 5 mm | 5 mm | 5 mm |
| Maximum depth y of chamfered portion (mm) | 2 mm | 2 mm | 2 mm | 2 mm |
| Structure of sipe (communicating or not communicating) | Communicating | Communicating | Communicating | Communicating |
| Inclination angle on acute angle side with respect to tire circumferential direction of sipe | 60° | 60° | 60° | 60° |
| Chamfered position of sipe (acute angle side or obtuse angle side) | Acute angle side | Acute angle side | Acute angle side | Acute angle side |
| Shape of entire sipe (straight lines or curved) | Curved | Curved | Curved | Curved |
| Presence or absence of opening into main groove of chamfered portion | Presence | Presence | Presence | Presence |
| Percentage of overlap length L1 of chamfered portion with respect to sipe length L | 0% | 0% | 0% | 0% |
| Number of chamfered positions (one or two) | 1 | 1 | 1 | 1 |
| Maximum width W1 of chamfered portion with respect to sipe width W (W1/W) | 2 | 2 | 2 | 2 |
| Shape of chamfer (parallel or non-parallel) | Parallel | Non-parallel | Parallel | Parallel |

TABLE 2-2-continued

|  | Example 11 | Example 12 | Example 13 | Example 14 |
| --- | --- | --- | --- | --- |
| Presence or absence of raised bottom portion of sipe | Absence | Absence | Presence | Presence |
| Height of raised bottom portion on portion other than end portions of sipe with respect to maximum depth x of sipe ($H_{144}$/x) | — | — | 0.6 | 0.3 |
| Steering stability performance on dry road surfaces | 105 | 104 | 110 | 109 |
| Steering stability performance on wet road surfaces | 108 | 106 | 105 | 109 |
| Uneven wear resistance performance | 105 | 103 | 110 | 110 |

As understood from Table 1 and Table 2, by devising the shapes of chamfered portions formed on the sipe, the uneven wear resistance performance was enhanced and the steering stability performance on dry road surfaces and the steering stability performance on wet road surfaces were enhanced at the same time for the tires in Examples 1 to 14.

On the other hand, in Comparative Example 1, since the maximum depth y of the chamfered portion was set to be very shallow, the effect of enhancing the steering stability performance on wet road surfaces was not obtained. Additionally, in Comparative Example 2, since the maximum depth y of the chamfered portion was set to be very deep, an effect of enhancing the steering stability performance on dry road surfaces was not obtained.

The invention claimed is:

1. A pneumatic tire comprising main grooves extending in a tire circumferential direction in a tread portion, the pneumatic tire comprising:
    a sipe extending in a tire lateral direction on a rib defined by the main grooves, wherein
    the sipe includes an edge on a leading side and an edge on a trailing side,
    chamfered portions shorter than a sipe length of the sipe are formed on the respective edges on the leading side and on the trailing side,
    non-chamfered regions, on which no other chamfered portion exists, are provided opposing the chamfered portions in the sipe,
    only one of the chamfered portions is present on each of the leading side and the trailing side,
    a maximum depth x (mm) of the sipe and a maximum depth y (mm) of the chamfered portion satisfy $x \times 0.1 \leq y \leq x \times 0.3 + 1.0$,
    a sipe width of the sipe is constant in a range from an end portion positioned inside in a tire radial direction of the chamfered portions to a groove bottom of the sipe, and
    each of the chamfered portions have a sipe edge where the chamfered portions intersect the sipes and an opposite edge opposite the sipe edge, where the opposite edge projects further inward into the rib, away from the main grooves from which the sipes extend, than the sipe edge.

2. The pneumatic tire according to claim 1, wherein each end portion of the sipe opens into one of the main grooves.

3. The pneumatic tire according to claim 1, wherein the sipe includes a raised bottom portion.

4. The pneumatic tire according to claim 3, wherein a height of the raised bottom portion disposed on a portion other than end portion of the sipe is from 0.2 to 0.5 times the maximum depth x of the sipe.

5. The pneumatic tire according to claim 3, wherein a height of the raised bottom portion disposed on an end portion of the sipe is from 0.6 to 0.9 times the maximum depth x of the sipe.

6. The pneumatic tire according to claim 1, wherein the sipe is inclined with respect to a tire circumferential direction.

7. The pneumatic tire according to claim 6, wherein an inclination angle on an acute angle side with respect to a tire circumferential direction of the sipe is from 40° to 80°.

8. The pneumatic tire according to claim 6, wherein the chamfered portion is disposed on an acute angle side of the sipe.

9. The pneumatic tire according to claim 6, wherein the chamfered portion is disposed on an obtuse angle side of the sipe.

10. The pneumatic tire according to claim 1, wherein at least part of the sipe curves or bends in a plan view.

11. The pneumatic tire according to claim 1, wherein the chamfered portion opens into one of the main grooves.

12. The pneumatic tire according to claim 1, wherein the chamfered portion terminates within the rib.

13. The pneumatic tire according to claim 1, wherein an overlap length of a chamfered portion formed on an edge on the leading side of the sipe and a chamfered portion formed on an edge on the trailing side of the sipe is from −30% to 30% of the sipe length.

14. The pneumatic tire according to claim 1, wherein the respective chamfered portions are disposed on a position of an edge on the leading side and on a position of an edge on the trailing side of the sipe.

15. The pneumatic tire according to claim 1, wherein a maximum width of the chamfered portion is from 0.8 to 5.0 times a sipe width of the sipe.

16. The pneumatic tire according to claim 1, wherein the chamfered portion extends in parallel with the sipe.

* * * * *